UNITED STATES PATENT OFFICE.

BYRON B. GOLDSMITH, OF NEW YORK, N. Y.

INDURATED ALBUMEN COMPOUND.

1,134,527. Specification of Letters Patent. Patented Apr. 6, 1915.

No Drawing. Original application filed October 7, 1907, Serial No. 396,189. Divided and this application filed March 2, 1912. Serial No. 681,306.

*To all whom it may concern:*

Be it known that I, BYRON B. GOLDSMITH, a citizen of the United States, residing in the borough of Manhattan, in the city of New York and State of New York, have invented certain new and useful Improvements in Indurated Albumen Compounds; and I do hereby declare the following to be a full, clear, and exact description of the invention, such as will enable others skilled in the art to which it appertains to make and use the same.

This present application for patent is a division of an application filed by me October 7th 1907, Serial No. 396189.

This invention has relation to an improved thermoplastic compound formed by treatment of blood and egg albumen and substances containing blood and egg albumen, as well as their compounds and derivatives. This class of substances comprises many compounds most complex, varied and often unstable in composition characteristics and behavior, and it is very possible that in carrying out certain forms of my invention changes will take place in the character of the materials acted upon; but such changes when they occur are not to be understood as removing the process or composition outside the scope of my invention, which is identified rather by the nature of the materials as they exist when the process is begun, in each case.

In my U. S. Patent Number 840,931, dated January 8th 1907, I have described a process whereby a thermoplastic compound may be made from casein or its derivatives, as a convenient and cheap substitute for celluloid, rubber and the like; and I made it clear in said patent that the term "thermoplastic" was meant to describe those masses which, while relatively hard at ordinary temperatures, are rendered softer by heat, so as to permit the uniting of separate masses and the molding of any mass to any desired shape.

My present invention is based upon the discovery that, by uniting the action of converting agents with that of formaldehyde or its equivalents upon blood and egg albumen and substances largely containing blood and egg albumen, as well as their cognate derivatives and compounds, an improved result is obtained, and the respective actions of the formaldehyde and converting agent are not destroyed.

Various processes have been proposed involving the treatment of casein with formaldehyde, and I do not herein claim such processes or their equivalents.

My novel invention is based upon the discovery that the three principal elements of my compound, namely blood and egg albumen—a converting agent—and formaldehyde or its equivalent can be combined substantially as herein described without destroying the effect of either of the three upon the final result.

The converting agent in my process is that chemical substance which, when combined or admixed with the blood and egg albumen acts whenever heated, to soften the same, but whose softening action is suspended or materially diminished upon lowering the temperature of the mass. Some of these converting agents are alpha-naphthol, beta-naphthol, benzoic acid, carbolic acid, hydrochinon, kresol, pyrocatechin, resorcin, salicylic acid, urea, benzoic acid, phthalic acid, phloroglucin, pryogallol, paratoluidin, naphthylamin, benzidin, oxynaphthoic acid, anilin, toluidin and zylidin. Although these substances and their derivatives and compounds are known to me to give good results for the purposes above set forth, it is to be understood that I do not limit myself to these substances and their derivatives and compounds, but that the term "converting agent" as used herein refers to any compound or substance having the effect desired. The mode of action of these converting agents is not altogether clear. In some cases it is probably due to partial solution of the blood and egg albumen when heated, but I do not limit myself to any theory of action nor is it essential to my invention whether or not there is a chemical combination between the blood and egg albumen and the converting agent.

I have discovered that the best results are obtained by the use of solid reagents such as alpha or beta naphthol and I have claimed this variant of my process and product specifically herein. Where flexibility is desired in the product, however, I have discovered that a liquid converting agent or other liquid not antagonistic to the mixture may be combined with a solid converting agent to great advantage. Certain converting agents are better adapted to be used with some blood and egg albumens than with others. I have also found that it is not necessary to isolate the blood and egg albumen acted upon in any case or to use it in a pure form, as the crude substances from which they are derived may ordinarily be used to advantage.

The degree of hardness of the thermoplastic compound in the cold state will vary with the particular converting agent employed and with the proportions used. Thus a great variety of characteristics are obtained by suitable variations in proportions and qualities.

In the manufacture of my composition the blood and egg albumens or their derivatives undergo the same treatment as is described in my patent aforesaid in connection with casein; that is to say they may be united with a suitable converting agent on and between suitably heated rolls, or any other method uniting these substances may be resorted to by which they are brought into intimate contact. Instead of using the converting agents in their natural state they may be first dissolved in alcohol, water or other suitable liquid which is afterward driven off by heat.

One of the practicable proportions which I have used is the following: Take four pounds of blood and egg albumen, dry and sprinkle the same with one pound of beta-naphthol dissolved in alcohol. This is then well mixed, preferably on suitably heated rolls, and, when the mixture is completed, the mass is removed and is soft while hot but hardens on cooling. In this manner sheets of thermoplastic material are produced which are quite plastic while hot, but harden on cooling. Scraps of various substances may be mixed in with the masses thus formed in considerable quantities. Among these are celluloid scraps, finely divided albuminoids, bits of horn, rubber, resins, gums and coloring matter. Compounding substances or fillers can also be incorporated without departing from this invention. The qualities of the thermoplastic compounds thus formed, are greatly improved in certain respects by treatment with an indurating agent such as formaldehyde or its equivalent. The term "indurating agent" as herein used applies to those agents, like formaldehyde, which give to the compound greater toughness and permanency, increasing the resistance to the action of water and lessening the tendency to separation of ingredients. Another advantage of using the indurating agent is that it lessens the possible tendency of the mass to stick to the mold in forming, and thus produces a better impression.

My invention covers the use of an indurating agent in connection with a converting agent, whether the one or the other of these agents be used alone or the two be mixed and applied simultaneously.

Where the converting agent is first employed various modified methods may be used. If only surface hardness is required, the desired form can be given to any article made of the compound formed as above described, and the finished article may then be dipped into an aqueous solution of the indurating agent or may be subjected to gaseous action (where formaldehyde is used). This treatment is prolonged according to the depth of hardening required.

If the action is so prolonged upon any given mass as to allow the treatment to reach the whole of it, it becomes brittle and the thermoplastic properties are somewhat impaired, that is to say the degrees of heat and pressure which must be used for molding purposes are more intense. When suitable heat and pressure are applied, however, a tough strong mass is obtained.

My preferred process is carried out by sprinkling the combined blood and egg albumen and converting agent in a powdered state with a solution of the indurating agent and then after drying applying suitable heat and pressure in a mold.

My process may also be carried out by first treating the blood and egg albumen or its derivatives or compound with the indurating agent and, after the more or less complete action of the latter, adding the converting agent. My invention also covers the mixing of the indurating material with the converting agent so that the two are added together to the blood and egg albumen.

I have found that, in order to produce the best results, the converting agent or agents employed should be "non-hygroscopic," by which I mean that they should not have the property of extracting moisture from the atmosphere. For this reason I have made specific claims for the use of non-hygroscopic converting agents. All of the agents which I have named above belong to this class.

In my claims the term "blood and egg albumen" covers substances principally composed of blood and egg albumens and derivatives and compounds of blood and egg albumen. The term "converting agent" covers any equivalent of the converting agents above specifically named; that is to say any agent which, on admixture with blood and egg albument or its equivalent, will form a union whereby they become more or less plastic as its temperature is raised or lowered. An "indurating agent" is any equivalent of formaldehyde for the purposes of my improved process; that is to say any suitable agent which toughens the thermoplastic mass described and increases its stability. The use of two or more kinds of albuminoid or converting agents or indurating agents is also covered by my claims.

What I claim is—

1. The process of producing a thermoplastic compound which consists in subjecting blood and egg albumen to the combined action of a converting agent and an indurating agent, and mixing the mass while heated to a suitable temperature, substantially as described.

2. The process of producing a thermoplastic compound which consists in subjecting blood and egg albumen to the combined action of a normally solid, non-volatile converting agent and an indurating agent and heating and pressing the mass, substantially as described.

3. The process of producing a thermoplastic compound which consists in subjecting blood and egg albumen to the combined action of beta-naphthol and formaldehyde and heating and pressing the mass, substantially as described.

4. The process of producing a thermoplastic compound which consists in intimately mixing with blood and egg albumen a solid converting agent and an indurating agent, and subjecting the mixture to heat and pressure, substantially as described.

5. The process of producing a thermoplastic compound which consists in subjecting blood and egg albumen to the modifying action of a solid converting agent and of an indurating agent, substantially as described.

6. The process of producing a thermoplastic compound which consists in subjecting blood and egg albumen to the modifying action of a solid non-volatile converting agent and of an indurating agent, substantially as described.

7. The process of producing a thermoplastic compound which consists in subjecting blood and egg albumen to the modifying action of a solid, non-volatile and non-hygroscopic converting agent and of an indurating agent, substantially as described.

8. The process of producing a thermoplastic compound which consists in first uniting blood and egg albumen with a solid converting agent and an indurating agent, and then heating and rolling the same before the action of the indurating agent is complete, substantially as described.

9. The process of producing a thermoplastic compound which consists in uniting blood and egg albumen with a solid converting agent and formaldehyde, substantially as described.

10. The process of producing a thermoplastic compound which consists in uniting blood and egg albumen, with a solid non-volatile converting agent and an indurating agent and subjecting the mass to heat and pressure, substantially as described.

11. The process of producing a thermoplastic compound which consists in subjecting blood and egg albumen to the modifying action of beta-naphthol and of an indurating agent, substantially as described.

12. The process of producing a thermoplastic compound which consists in subjecting blood and egg albumen to the modifying action of beta-naphthol and formaldehyde, substantially as described.

13. The process of producing a thermoplastic compound which consists in intimately mixing blood and egg albumen with beta-naphthol and an indurating agent and subjecting the mass to heat and pressure, substantially as described.

14. The process of producing a thermoplastic compound which consists in intimately mixing blood and egg albumen with beta-naphthol and formaldehyde, and then subjecting the mass to heat and pressure, substantially as described.

15. A composition of matter consisting of blood and egg albumen united with a solid converting agent and an indurating agent, substantially as described.

16. A composition of matter consisting of blood and egg albumen united with a solid converting agent and formaldehyde, substantially as described.

17. A composition of matter consisting of blood and egg albumen united with beta-naphthol and an indurating agent, substantially as described.

18. A composition of matter consisting of blood and egg albumen united with beta-naphthol and formaldehyde, substantially as described.

19. A composition of matter consisting of blood and egg albumen united with a solid non-volatile converting agent and an indurating agent, substantially as described.

20. A composition of matter consisting of blood and egg albumen united with a solid non-volatile and non-hygroscopic converting agent and formaldehyde, substantially as described.

In testimony whereof, I affix my signature, in presence of two witnesses.

BYRON B. GOLDSMITH.

Witnesses:
FRANK DRECOS,
F. J. MRAZ.